(12) United States Patent
Bakke et al.

(10) Patent No.: US 6,971,049 B2
(45) Date of Patent: Nov. 29, 2005

(54) METHOD AND APPARATUS FOR DETECTING AND ISOLATING FAILURES IN EQUIPMENT CONNECTED TO A DATA BUS

(75) Inventors: Brian E. Bakke, Rochester, MN (US); Steven Paul Norgaard, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 10/153,976

(22) Filed: May 23, 2002

(65) Prior Publication Data

US 2003/0221140 A1 Nov. 27, 2003

(51) Int. Cl.⁷ ............................................. G06F 11/00
(52) U.S. Cl. .......................................... 714/44; 714/42
(58) Field of Search ............................. 714/42, 43, 44, 714/47, 56

(56) References Cited

U.S. PATENT DOCUMENTS

| | | | | |
|---|---|---|---|---|
| 4,459,693 A | * | 7/1984 | Prang et al. | 714/734 |
| 4,727,537 A | * | 2/1988 | Nichols | 370/236 |
| 4,857,833 A | * | 8/1989 | Gonzalez et al. | 324/512 |
| 4,951,283 A | * | 8/1990 | Mastrocola et al. | 714/43 |
| 6,032,271 A | * | 2/2000 | Goodrum et al. | 714/56 |
| 6,389,568 B1 | * | 5/2002 | Leshay et al. | 714/749 |

FOREIGN PATENT DOCUMENTS

JP            11282635 A     * 10/1999     ............. G06F 3/06

OTHER PUBLICATIONS

"SCSI configuration topology validation method—uses logic blocks to sample each connector to determine the presenc of a cables", IBM Corp, Mar. 10, 1999, Derwent.*
Microsoft Press Computer Dictionary Third Edition, "SCSI", Microsoft Press, 1997, p. 423.*

* cited by examiner

*Primary Examiner*—Robert Beausoliel
*Assistant Examiner*—Gabriel L. Chu
(74) *Attorney, Agent, or Firm*—Dugan & Dugan

(57) ABSTRACT

In a first aspect, a computer system includes a storage adapter, a disk drive and a SCSI bus interconnecting the storage adapter and the disk drive. The storage adapter is connected to the SCSI bus via a first active termination circuit and the disk drive is connected to the SCSI bus via a second active termination circuit. The first active termination circuit is disabled and diagnostic signals are coupled to the bus. The frequency of errors in the diagnostic signals is detected to determine whether the second active termination circuit is in a failing condition.

26 Claims, 4 Drawing Sheets

METHOD AND APPARATUS FOR DETECTING AND ISOLATING FAILURES IN EQUIPMENT CONNECTED TO A DATA BUS

FIELD OF THE INVENTION

The present invention is concerned with data processing systems, and is more particularly concerned with diagnosing failures in data processing systems.

BACKGROUND OF THE INVENTION

FIG. 1 is a block diagram that illustrates a conventional computer system in which the present invention may be applied. Reference numeral 10 generally indicates the computer system. The computer system 10 includes a host computer 12. The host computer 12 is connected to a storage adapter 14 by means of a peripheral bus 16. The peripheral bus 16 may, for example, be provided in accordance with the PCI (Peripheral Component Interconnect) standard.

A plurality of storage devices 18 (e.g., disk drives) are connected to the storage adapter 14 via a data bus 20. The data bus 20 may, for example, be provided in accordance with the SCSI (Small Computer System Interface) standard.

Each of the storage devices 18 is connected to the data bus 20 via a respective device slot 22. Each device slot 22 includes a bus connection 24 by which the respective storage device 18 is connected to the data bus 20, and a power connection 26 by which a power signal is provided to the respective storage device 18. Although only two storage devices 18 are explicitly shown in FIG. 1 (Device 1 and Device N), it should be understood that the number of storage devices connected to the data bus 20 may be larger. For example, it is customary to connect three, four or more storage devices to a host computer via a single storage adapter.

Also connected to the data bus 20 is an SES (SCSI enclosure services) node 28. The SES node 28 is connected to the device slots 22 via a control bus 30. (The control bus 30 may be provided in accordance with the I2C standard. Instead of the control bus 30, individual control signal connections (not shown) may be provided from the SES node 28 to the device slots 22.) In response to control signals sent to the SES node 28 by the storage adapter 14 over the data bus 20, the SES node 28 controls the device slots 22 to selectively remove power from the storage devices 18. Disabling of the power for the storage devices 18 may take place in connection with, for example, removal and/or replacement of a storage device 18 concurrent with operation of the computer system 10.

Each of the storage adapter 14, the storage devices 18 and the SES node 28 includes a respective bus driver/receiver circuit 32 and an active termination circuit 34. The bus driver/receiver circuits 32 and the active termination circuits 34 are provided to interface the storage adapter 14, the storage devices 18 and the SES node 28 to the data bus 20.

The storage adapter 14 also includes a processor 36 and a memory 38 associated with the processor 36. The memory 38 stores a program (not separately shown) which controls the processor 38 so that the storage adapter 14 performs its functions such as managing the storage devices 18 and the SES node 28.

The active terminations 34 are provided to prevent or minimize reflections of signals coupled to the data bus 20. When an active termination circuit 34 fails, intermittent errors may result. Because of the intermittent nature of such errors, it may be difficult to determine which particular active termination circuit 34 has failed. It is known to examine the errors reported by the computer system 10 and to attempt to infer from the reported errors which component is the source of the errors. This approach frequently fails to isolate the failing component. Consequently, the service provided to the proprietor of the computer system 10 may be less satisfactory than it would otherwise be, and the vendor of the computer system 10 or other party in charge of maintaining the computer system 10 may incur increased costs for service calls. Increased costs may also be incurred for replacement parts, when a component that is not at fault is erroneously replaced. Because of difficulty in identifying a failing component, it is known to take a "shotgun" approach, by replacing numerous parts of the computer system 10 to ensure that the failing component is replaced. This approach leads to additional parts costs for the vendor or service provider, and there remains the possibility that the failing component is not replaced and that further errors and service problems may arise.

It would accordingly be desirable to improve diagnostic procedures that are employed for detecting the source of intermittent errors in computer systems like the computer system 10, and more particularly to improve diagnosis of the source of intermittent errors on a data bus.

SUMMARY OF THE INVENTION

According to a first aspect of the invention, a computer system is provided. The computer system includes a bus, a plurality of components connected to the bus, and a mechanism adapted to selectively disable the components. The mechanism adapted to selectively disable the components is automatically controlled to disable all but one of the components to detect a failure condition in the one of the components.

In at least one embodiment, the components may be active termination circuits and may be included in respective disk drives interfaced to the bus via the respective active termination circuits.

According to a second aspect of the invention, a computer system is provided. The inventive computer system according to the second aspect of the invention includes a bus, a plurality of components connected to the bus, and a mechanism adapted to selectively disconnect the components from the bus. The mechanism adapted to selectively disconnect the components is automatically controlled to disconnect all but one of the components from the bus to detect a failure condition in the one of the components.

According to a third aspect of the invention a computer system is provided. The inventive computer system according to the third aspect of the invention includes a bus, a first device interfaced to the bus via a first active termination circuit, a second device interfaced to the bus via a second active termination circuit, a mechanism adapted to selectively disable the first active termination circuit, a mechanism adapted to couple diagnostic signals to the bus while the first active termination circuit is disabled, and a mechanism adapted to detect a frequency of errors in the diagnostic signals to determine whether the second active termination circuit is in a failing condition. It may be determined that the second active termination circuit is in a failing condition when the frequency of errors in the diagnostic signals exceeds a threshold. In at least one embodiment, the first device may be a storage adapter and the second device may be a disk drive.

According to a fourth aspect of the invention, a method of detecting a fault in a computer system is provided. The method includes automatically disabling all but one of a plurality of components connected to a bus, and detecting a failure condition in the one of the components.

According to a fifth aspect of the invention, a method of detecting a fault in a computer system is provided. The inventive method according to the fifth aspect of the invention includes automatically disconnecting from a bus all but one of a plurality of components of the computer system, and detecting a failure condition in the one of the components.

According to a sixth aspect of the invention, a method of detecting a fault in a computer system is provided. The inventive method according to the sixth aspect of the invention includes disabling a first active termination circuit connected to a bus, coupling diagnostic signals to the bus while the first active termination circuit is disabled, and detecting a frequency of errors in the diagnostic signals to determine whether a second active termination circuit connected to the bus is in a failing condition.

Numerous other aspects are provided, as are computer program products. Each inventive computer program product may be carried by a medium readable by a computer (e.g., a carrier wave signal, a floppy disk, a hard drive, a random access memory, etc.).

With the methods and apparatus of the present invention, intermittent failures can be diagnosed properly, and failing components identified, so that additional service calls are not required, and non-failing components need not be replaced.

Other objects, features and advantages of the present invention will become more fully apparent from the following detailed description of exemplary embodiments, the appended claims and the accompanying drawings.

DETAILED DESCRIPTION

Figure 1:
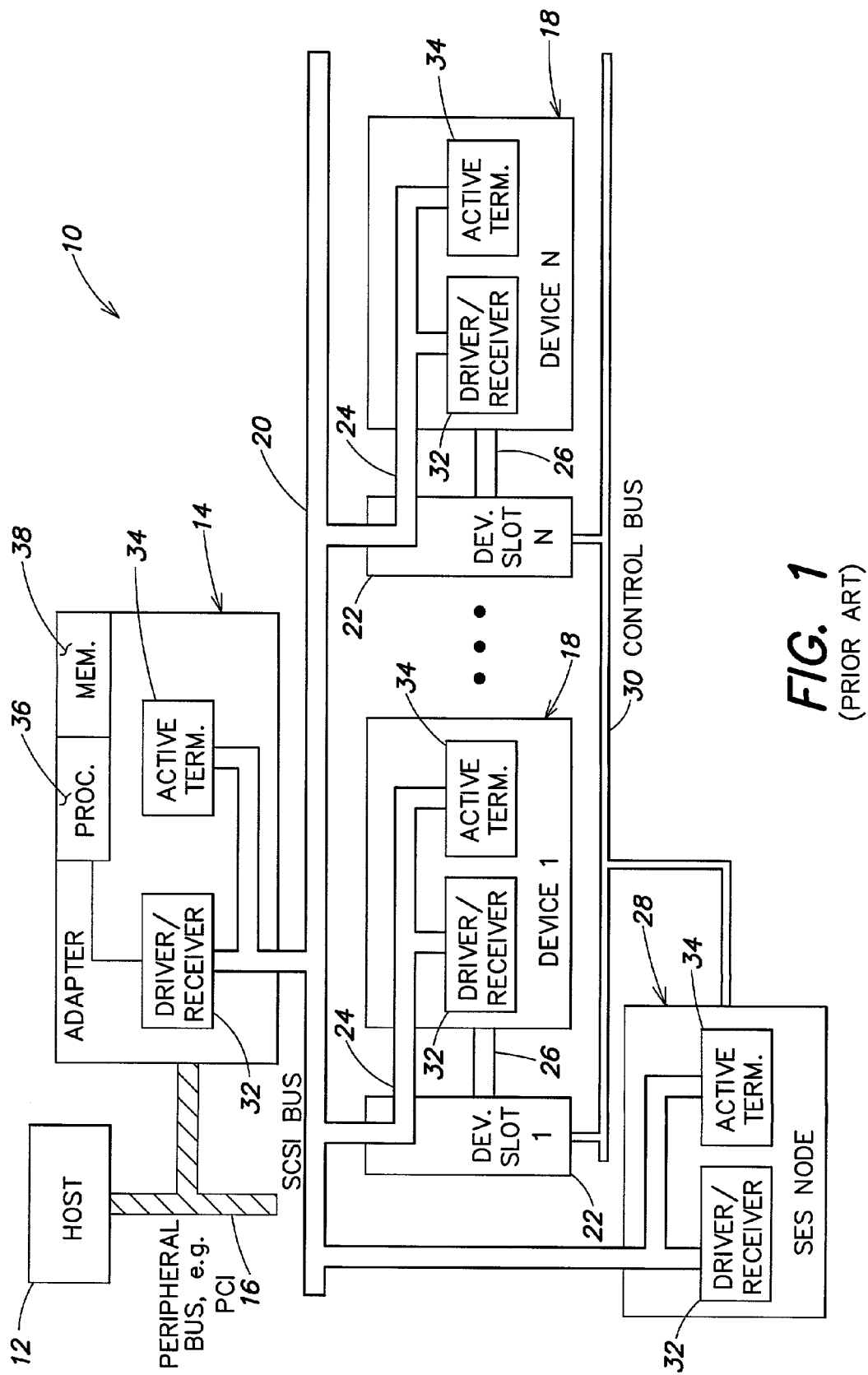
FIG. 1 is a block diagram that illustrates a conventional computer system in which the present invention may be applied.
Figure 2:
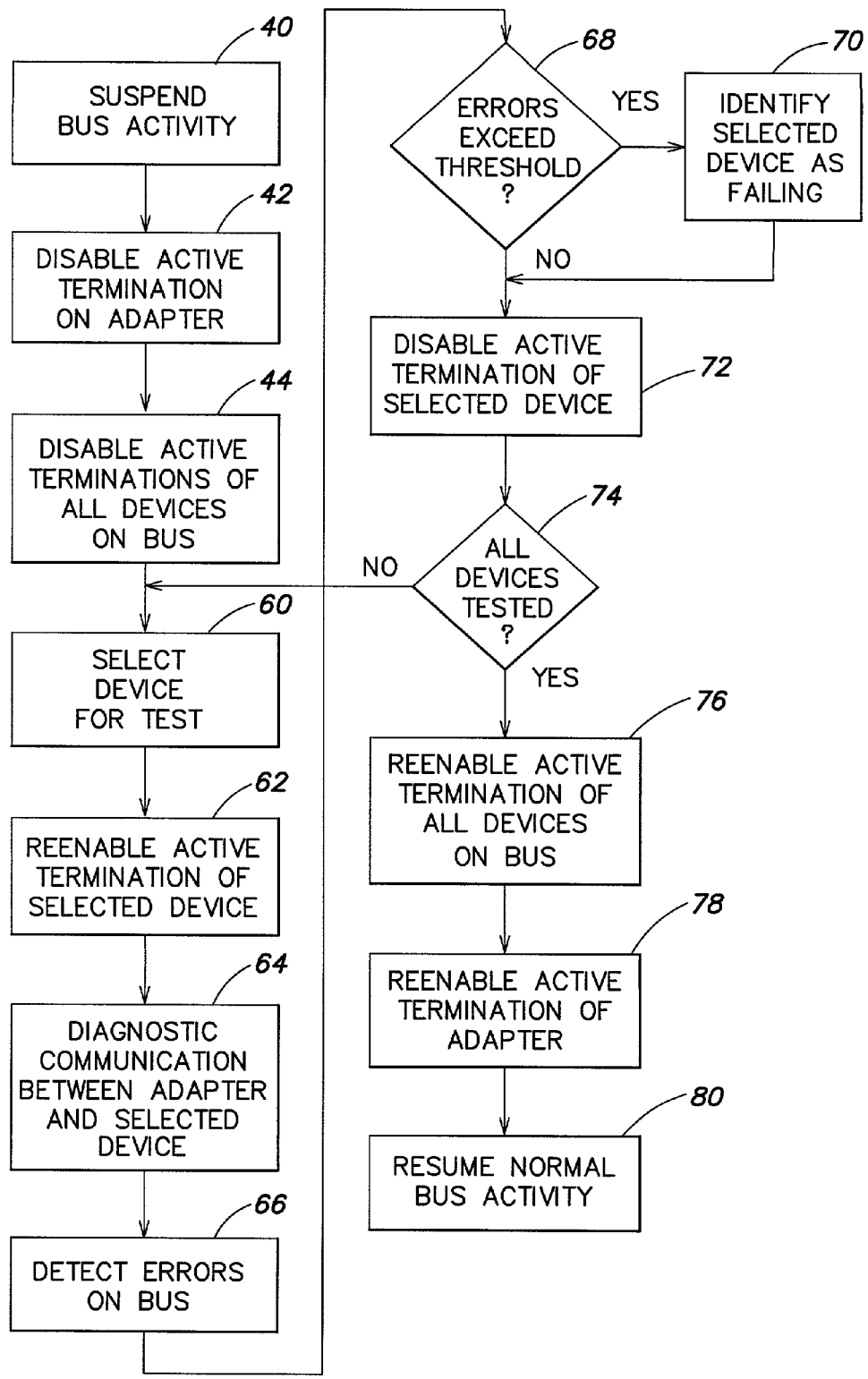
FIG. 2 is a flow chart that illustrates a process provided in accordance with the invention for detecting and diagnosing failures of active termination circuits included in the computer system of FIG. 1.

Failure of one of the active termination circuits 34 of the storage devices 18 of FIG. 1 may result in intermittent errors that are difficult to isolate to the particular failing active termination circuit 34 by using conventional diagnostic and maintenance procedures. FIG. 2 is a flow chart that illustrates a process provided in accordance with the invention for detecting and isolating failures of active termination circuits. The process of FIG. 2 may be performed by the storage adapter 14 under the control of software provided in accordance with the invention and stored in the memory 38 of the storage adapter 14 to control the processor 36 of the storage adapter 14. The software to carry out the inventive process may be developed by a person of ordinary skill in the art based on the disclosure herein and may include one or more computer program products.

The process of FIG. 2 begins with a block 40, at which activity on the data bus 20 is suspended. The step of suspending bus activity, sometimes referred to as "quiescing" the bus, entails the storage adapter 14 ceasing to issue commands to the storage devices 18, and waiting for completion of execution of all outstanding commands. It may be possible to accelerate the suspension of activity on the bus by coupling signals onto the bus to make it appear to the storage devices 18 that the bus is busy.

Following block 40 is block 42, at which the active termination circuit 34 of the storage adapter 14 is disabled. To allow block 42 to be carried out under the control of the processor 36, a conventional storage adapter may be modified so as to allow the processor 36 to selectively turn on and off the active termination circuit 34 of the storage adapter 14.

Following block 42 is block 44. At block 44, the active termination circuits 34 of all of the storage devices 18 are disabled. This may be done by commanding the SES node 28 to control the device slots 22 so that power is removed from all of the storage devices 18. In addition, the SES node 28 may be commanded to disable its own active termination circuit 34.

Figure 3:
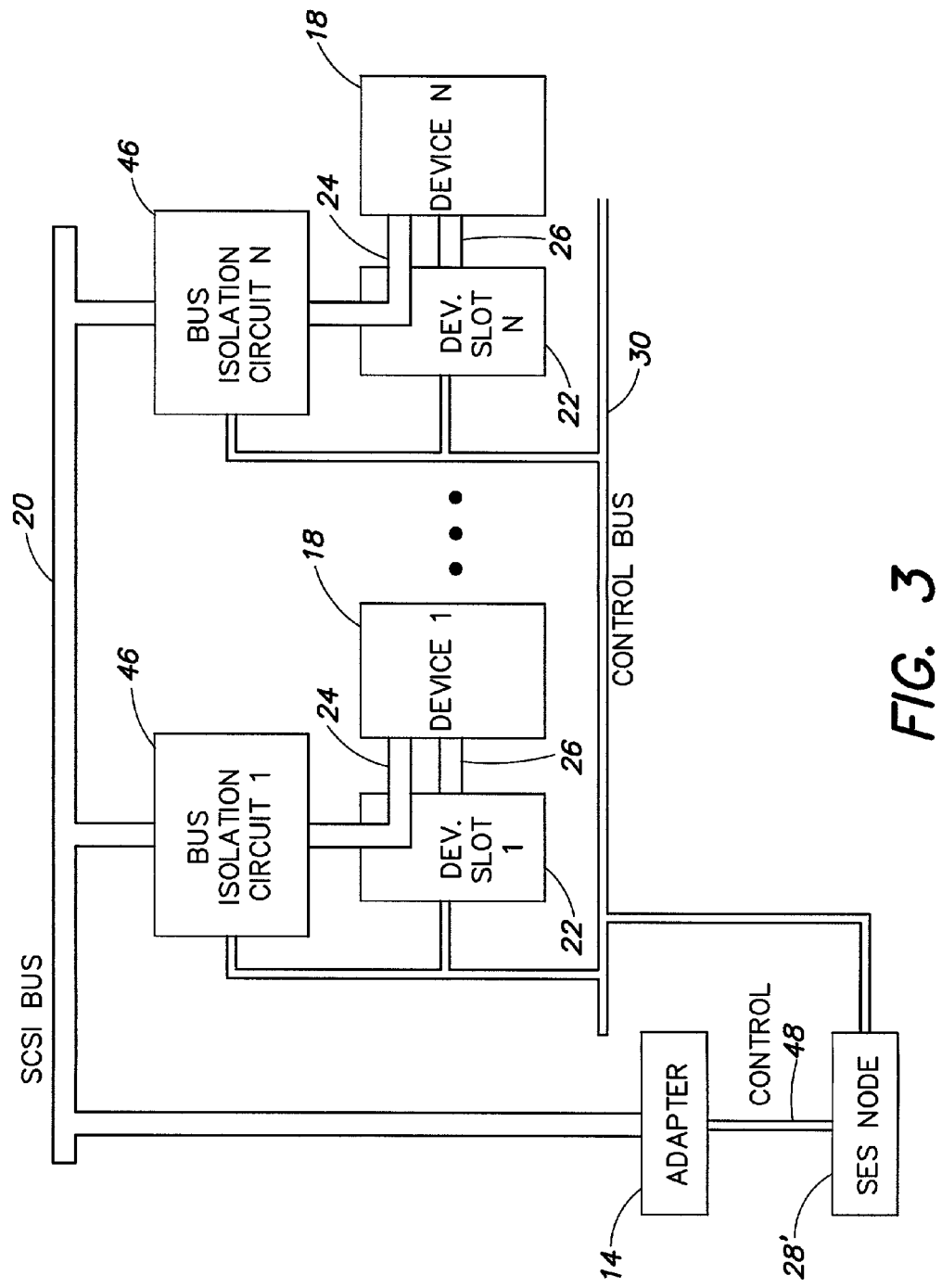
FIG. 3 is a block diagram that illustrates an arrangement provided in accordance with the invention for selectively isolating storage devices from a data bus.
Figure 4:
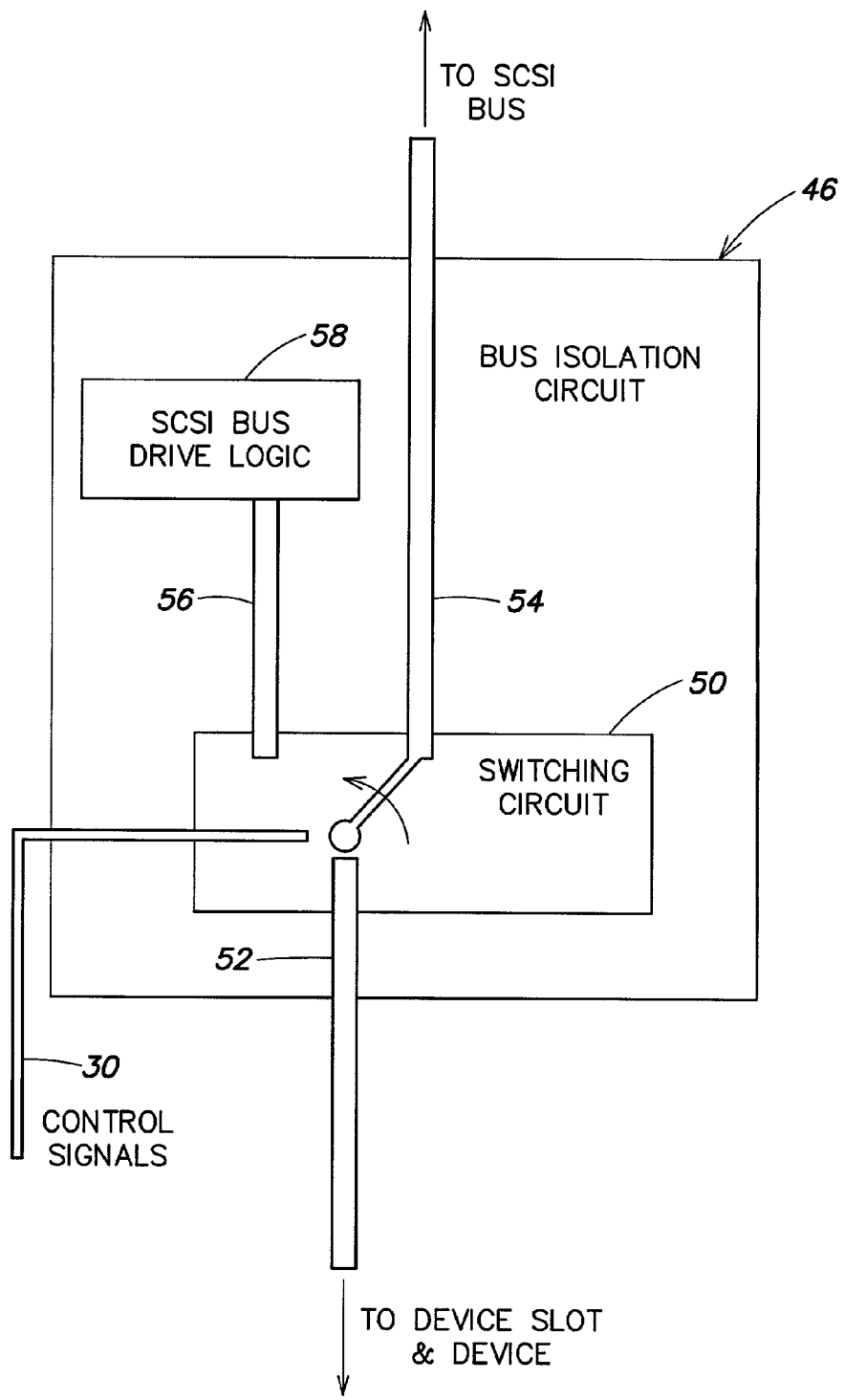
FIG. 4 is a block diagram that schematically illustrates a typical bus isolation circuit included in the arrangement of FIG. 3.

As an alternative to removing power from all of the storage devices 18, the storage devices 18 may instead all be isolated from the data bus 20, by means of an arrangement such as that illustrated in FIGS. 3 and 4. According to the arrangement of FIG. 3, a respective bus isolation circuit 46 is interposed in the data path between each device slot 22 and the data bus 20. The bus isolation circuits 46 are connected to the control bus 30, and are arranged to receive control signals from the SES node indicated by reference numeral 28' in FIG. 3. In the arrangement of FIG. 3, the SES node 28' is shown to be connected to the storage adapter 14 via a control signal channel 48 instead of being connected to the storage adapter 14 via the data bus 20. However, the alternative arrangement is also contemplated, i.e. the SES node 28' may be connected to the storage adapter 14 via the data bus 20, as in the computer system of FIG. 1, instead of being connected to receive control signals from the storage adapter 14 via the control signal channel 48. The control signal channel 48 may be implemented, for example, in accordance with the above-mentioned I2C standard.

FIG. 4 is a block diagram that schematically illustrates certain details of a typical one of the bus isolation circuits 46. The bus isolation circuit 46 includes a switching circuit 50. The switching circuit 50 includes a first terminal 52 which is connected to the respective device slot 22 (FIG. 3). The first terminal 52 is also connected to the corresponding storage device 18 via the device slot 22 and the bus connection 24. Continuing to refer to FIG. 4, the switching circuit 50 also includes a second terminal 54 connected to the data bus 20 (FIG. 3). The switching circuit 50 also includes a third terminal 56 which is connected to SCSI bus drive logic 58.

The switching circuit 50 operates under the control of control signals provided from the SES node 28' (FIG. 3) via the control bus 30 (or alternatively via individual control signal connections, which are not shown) to selectively connect either the second terminal 54 or the third terminal 56 to the first terminal 52. When the switching circuit 50 connects the first terminal 52 to the second terminal 54, the corresponding storage device 18 is connected to the data bus 20. When the switching circuit 50 connects the first terminal 52 to the second terminal 54, the corresponding storage device 18 is disconnected from the data bus 20 and is instead connected to the SCSI bus drive logic 58. The SCSI bus drive logic 58 generates signals that simulate traffic on the data bus 20 such that, when the switching circuit 50 connects the first terminal 52 to the third terminal 56, it appears to the corresponding storage device 18 that it is still connected to the data bus 20 and that the data bus 20 is busy. By providing simulated bus busy signals to the corresponding storage device 18 when it is disconnected from the data bus 20, the SCSI bus drive logic 58 prevents the corresponding storage device 18 from attempting to initiate interaction with the data bus 20 and the storage adapter 14. If the storage device 18 were not induced to refrain from initiating activity while disconnected from the data bus 20, the storage device 18 might unsuccessfully attempt to initiate activity, resulting in an error condition generated by the corresponding storage device 18.

In one embodiment of the invention, the storage adapter 14 (or the SES node 28' if connected to the data bus 20) operates to couple a simulated bus activity signal to the data bus 20 at times when the switching circuit 50 switches from the second terminal 54 to the third terminal 56 or vice versa. This is done to prevent the corresponding storage device 18 from seeing a potentially disruptive transition at the time the switching circuit 50 switches from one position to another.

In an alternative embodiment of the bus isolation circuit 46, no SCSI bus drive logic 58 is provided, and the bus isolation circuit simply operates to selectively disconnect the corresponding storage device 18 from the data bus 20.

In any event, referring again to block 44 of FIG. 2, either all of the active terminations 34 of the storage devices 18 are disabled by removing power from the storage devices 18, or the storage devices 18 are disconnected from the data bus 20 by means of an arrangement such as that shown in FIGS. 3 and 4. Following block 44 in FIG. 2 is block 60. At block 60 one of the storage devices 18 is selected for testing by the storage adapter 14. Following block 60 is block 62. At block 62 the storage adapter 14 controls the SES node 28 or 28', as the case may be, so that the active termination circuit 34 of the selected storage device 18 is reenabled by restoring power to the selected storage device 18, or the selected storage device 18 is reconnected to the data bus 20.

Block 64 follows block 62. At block 64 the storage adapter 14 causes communication for diagnostic purposes to occur over the data bus 20 between the storage adapter 14 and the selected storage device 18. For example, the storage adapter 14 may cause data read operations to be performed by the selected storage device 18. It is preferred that read operations be performed with respect to the selected storage device 18 instead of write operations since write operations may change the condition of data stored on the selected storage device 18.

It will be recalled that the active termination circuit 34 of the storage adapter 14 had been disabled at block 42. Consequently, the diagnostic communication occurring as a result of block 64 takes place with only the active termination circuit 34 of the selected storage device 18 enabled. If the active termination circuit 34 of the selected data storage device 18 is functioning properly, then the data communication channel between the storage adapter 14 and the selected storage device 18 will be in a marginal condition, because the active termination circuit 34 of the storage adapter 14 is disabled, and intermittent errors are likely to occur. However, if the active termination circuit 34 of the selected storage device 18 is in a failing condition, then the data communication channel between the storage adapter 14 and the selected storage device 18 will be in a poor condition, because no properly functioning active termination circuit 34 is connected to the data bus 20, and it is likely that frequent errors will occur.

Following block 64 is block 66. At block 66, the storage adapter 14 determines how frequently errors are occurring on the data bus 20 during the diagnostic communication between the storage adapter 14 and the selected storage device 18.

Following block 66 is decision block 68. At decision block 68 the storage adapter 14 determines whether a frequency of errors detected at block 66 exceeds a threshold. For example, a threshold of zero may be employed, meaning that any errors encountered would be taken to indicate a problem. Such a threshold would be appropriate for an LVD (low voltage differential) SCSI environment, and is based upon an expected soft error rate for the communication channel. Errors occurring more frequently than the expected soft error rate indicate a probable failure. Given a controlled environment with short cable runs, errors would be expected to be very infrequent so that any error found in a relatively short duration test likely indicates a problem. In other words, via blocks 66 and 68, the storage adapter 14 may determine whether the communication channel between the storage adapter 14 and the selected storage device 18 is poor or only marginal. If a positive determination is made at decision block 68, i.e., if the frequency of detected errors exceeds the threshold, indicating that the communication channel is poor, then the selected storage device 18 is identified as failing (block 70). A suitable error message reporting the failure of the selected storage device 18 may then be generated and sent by the storage adapter 14 to the host computer 12.

Block 72 either follows block 70, or directly follows decision block 68 if a negative determination is made at block 68 (i.e., if it is determined at block 68 that the frequency of errors detected at block 66 does not exceed the threshold). At block 72, the active termination circuit 34 of the selected storage device 18 is once again disabled. As before, this may occur by the SES node 28 (under control by the storage adapter 14) controlling the device slot 22 which corresponds to the selected storage device 18 to remove power from the selected storage device 18, or, alternatively, by the SES node 28 controlling the bus isolation circuit 46 which corresponds to the selected storage device 18 to disconnect the selected storage device 18 from the data bus 20.

In either case, following block 72 is a decision block 74. At decision block 74, it is determined whether all of the storage devices 18 have been tested in accordance with blocks 60–72. If not, then the process of FIG. 2 loops back to block 60 and another (untested) storage device 18 is selected for testing and tested in accordance with blocks 60-72. However, if at decision block 74 it is determined that all of the storage devices 18 have been tested, then block 76 follows decision block 74. At block 76, all of the active termination circuits 34 of the storage devices 18 are reenabled. This may occur, for example, by the SES node 28 restoring power to all of the storage devices 18 via the device slots 22, or, alternatively, by the SES node 28' reconnecting the storage devices 18 to the data bus 20 via the bus isolation circuits 46. Next, at block 78, the storage adapter 14 operates to reenable its active termination circuit 34. Then, at block 80, the storage adapter 14 operates to resume normal activity on the data bus 20.

Because of the manner in which bus activity is suspended by the storage adapter 14, no error conditions are produced, and the operation of application programs on the host computer 12 is not interrupted. Moreover, the process of FIG. 2 may be performed rapidly enough such that there is no noticeable disruption of operation of the computer system 10, and users are not aware that normal operation of the data bus 20 has been temporarily superceded by the diagnostic procedure of FIG. 2.

The inventive process makes it possible to detect and isolate failures of active termination circuits 34 of storage devices 18 even though such failures tend to produce intermittent errors that cannot be readily isolated by conventional diagnostic procedures. Consequently, the storage device 18 in which the active termination circuit 34 has failed can be pinpointed and replaced, thereby eliminating future errors and making it unnecessary to provide additional service calls or to replace numerous components of the computer system.

It will be appreciated that the inventive diagnostic process may be modified to detect other causes of intermittent errors besides failures of active termination circuits 34. For example, the inventive process may be modified to detect and isolate failures of bus driver/receiver circuits 32 of the storage devices 18 and/or to detect loose pins in connections between the storage devices 18 and the device slots 22.

The inventive process of FIG. 2 may also be modified by omitting block 42, i.e., by having the active termination circuit 34 of the storage adapter 14 remain enabled. In such a case, a threshold employed at decision block 68 should be set to distinguish between a properly operating communication channel and a marginal communication channel. However, disabling of the active termination circuit 34 of the storage adapter 14 is preferred, since a poor communication channel is likely to be detected more easily and more rapidly, as compared to a marginal communication channel, than a marginal communication channel is detected as compared to a properly operating communication channel.

The inventive diagnostic procedure may be performed, for example, each time the computer system 10 is booted up, as part of normal testing at the time of boot up. Incorporating the inventive diagnostic procedure as part of routine boot up testing may make it possible to detect a failure and identify the failing component before the failing component causes errors or other problems. Such preventative testing of the computer system 10 may prevent users of the system from being adversely affected by the failing component.

In addition, or alternatively, the inventive diagnostic procedure may be performed at intervals during normal operation of the computer system (e.g., every 24 hours or at some other periodic rate). Again, such periodic operation of the inventive diagnostic procedure may detect a failure and identify the failing component before there is any adverse effect upon operation of the computer system. As noted before, the inventive diagnostic procedure may be performed without disrupting normal operation of the computer system.

In addition, or as still a further alternative, the inventive diagnostic procedure may be performed in response to a command from the host computer 12. In this case, the inventive diagnostic procedure may be performed in response to the host computer 12 detecting operating errors on the data bus 20. Again it is noted that performance of the inventive diagnostic procedure does not disrupt normal system operation. The host computer 12 may, for example, command that the inventive diagnostic procedure be performed as part of a system error recovery procedure.

In addition or as still another alternative, the storage adapter 14 may perform the inventive diagnostic procedure in response to the storage adapter 14 detecting one or more errors on the data bus 20. Thus the inventive diagnostic procedure may enable the storage adapter 14 to provide better fault identification.

In addition, or as yet another alternative, the inventive diagnostic procedure may be performed as a final exit test during system manufacture and/or assembly before the system is shipped to the customer. An advantage of testing at this point is that the components are tested in the system environment. Also, the inventive diagnostic procedure can be performed over an extended period of time, since the system is not in use by the customer, so that some system disruption can be tolerated. An extended duration test may detect more problems by allowing greater opportunity for the error to occur during the test. Additionally, failure of the test at this time allows greater flexibility in diagnosing the problem since the system is not yet in the customer's hands, so a failure may lead to the system being pulled from the system manufacturing line for an extended or more exhaustive test to provide better fault determination and isolation.

The foregoing description discloses only exemplary embodiments of the invention; modifications of the above disclosed apparatus and methods which fall within the scope of the invention will be readily apparent to those of ordinary skill in the art. For example, although the present invention has been described above in connection with diagnosing errors on a SCSI bus, it is contemplated to apply the present invention to other multidrop busses, such as PCI or I2C busses. It is generally contemplated to apply the present invention to any shared communication channel in which a non-participating device can affect communications between other devices.

Accordingly, while the present invention has been disclosed in connection with exemplary embodiments thereof, it should be understood that other embodiments may fall within the spirit and scope of the invention, as defined by the following claims.

The invention claimed is:

1. A computer system, comprising:
   a bus;
   a plurality of components connected to the bus; and
   a mechanism adapted to selectively disable the components; wherein the mechanism adapted to selectively disable the components is automatically controlled to disable all but one of the components to detect a failure condition in said one of the components and wherein the components are active termination circuits.

2. The computer system of claim 1, wherein each of the active termination circuits is included in a respective disk drive interfaced to the bus via the respective active termination circuit.

3. The computer system of claim 1, wherein the bus is a SCSI bus.

4. The computer system of claim 1, wherein the mechanism adapted to selectively disable the components includes an enclosure services node.

5. A computer system, comprising:
   a bus;
   a plurality of components connected to the bus, wherein the components are active termination circuits; and
   a mechanism adapted to selectively disconnect the components from the bus, wherein the mechanism adapted to selectively disconnect the components is automatically controlled to disconnect all but one of the components from the bus to detect a failure condition in said one of the components.

6. The computer system of claim 5, wherein each of the active termination circuits is included in a respective disk drive interfaced to the bus via the respective active termination circuit.

7. The computer system of claim 5, wherein the bus is a SCSI bus.

8. The computer system of claim 5, wherein the mechanism adapted to selectively disconnect the components includes an enclosure services node.

9. The computer system of claim 8, further comprising a plurality of bus isolation circuits, each interposed between the bus and a respective one of the components.

10. A computer system, comprising:
a bus;
a plurality of components connected to the bus;
a plurality of bus isolation circuits, each interposed between the bus and a respective one of the components; and
a mechanism adapted to selectively disconnect the components from the bus, wherein the mechanism adapted to selectively disconnect the components is automatically controlled to disconnect all but one of the components from the bus to detect a failure condition in said one of the components,
wherein the mechanism adapted to selectively disconnect the components includes an enclosure services node, and
wherein each of the bus isolation circuits includes bus drive logic adapted to provide a simulated bus busy signal to a corresponding one of the components at a time when the component is not connected to the bus.

11. A computer system, comprising:
a bus;
a first device interfaced to the bus via a first active termination circuit;
a second device interfaced to the bus via a second active termination circuit;
a mechanism adapted to selectively disable the first active termination circuit;
a mechanism adapted to couple diagnostic signals to the bus while the first active termination circuit is disabled; and
a mechanism adapted to detect a frequency of errors in the diagnostic signals to determine whether the second active termination circuit is in a failing condition.

12. The computer system of claim 11, wherein the mechanism adapted to detect determines that the second active termination circuit is in a failing condition when the frequency of errors in the diagnostic signals exceeds a threshold.

13. The computer system of claim 11, wherein the second device is a disk drive.

14. The computer system of claim 13, wherein the first device is a storage adapter.

15. The computer system of claim 11, further comprising a plurality of third devices each interfaced to the bus via a respective active termination circuit, and wherein the mechanism adapted to selectively disable the first active termination circuit also selectively disables the respective active termination circuits of the third devices.

16. The computer system of claim 15, wherein the second device and the third devices are disk drives and the first device is a storage adapter.

17. The computer system of claim 11, further comprising a plurality of third devices each interfaced to the bus via a respective active termination circuit, and wherein the mechanism adapted to selectively disable the first active termination circuit also selectively disconnects from the bus the respective active termination circuits of the third devices.

18. The computer system of claim 17, wherein the second device and the third devices are disk drives and the first device is a storage adapter.

19. A method of detecting a fault in a computer system, the method comprising:
automatically disabling all but one of a plurality of components connected to a bus; and
detecting a failure condition in said one of the components,
wherein the components are active termination circuits.

20. A method of detecting a fault in a computer system, the method comprising:
automatically disconnecting from a bus all but one of a plurality of components of the computer system; and
detecting a failure condition in said one of the components,
wherein the components are active termination circuits.

21. A method of detecting a fault in a computer system, the method comprising:
automatically disconnecting from a bus all but one of a plurality of components of the computer system;
detecting a failure condition in said one of the components; and
supplying to each of the disconnected components a signal to indicate that the bus is busy.

22. A method of detecting a fault in a computer system, the method comprising:
disabling a first active termination circuit connected to a bus;
coupling diagnostic signals to the bus while the first active termination circuit is disabled; and
detecting a frequency of errors in the diagnostic signals to determine whether a second active termination circuit connected to the bus is in a failing condition.

23. The method of claim 22, where the second active termination circuit is determined to be in a failing condition when the frequency of errors in the diagnostic signals exceeds a threshold.

24. The method of claim 22, further comprising disabling a plurality of other active termination circuits connected to the bus; and wherein the diagnostic signals are coupled to the bus while the other active termination circuits are disabled.

25. A computer program product comprising:
a memory readable by a computer, the computer readable memory storing computer program code adapted to:
disable a first active termination circuit connected to a bus;
couple diagnostic signals to the bus while the first active termination circuit is disabled; and
detect a frequency of errors in the diagnostic signals to determine whether a second active termination circuit connected to the bus is in a failing condition.

26. A bus isolation circuit, comprising:
bus drive logic for simulating bus busy signals;
a first terminal adapted to be connected to a storage device;
a second terminal adapted to be connected to a data bus;
a third terminal connected to the bus drive logic; and
a switching circuit adapted to selectively connect the first terminal to exclusively one of the second terminal or the third terminal.

* * * * *